(12) United States Patent
Rockwell (10) Patent No.: US 6,471,862 B1
(45) Date of Patent: Oct. 29, 2002

(54) OIL SKIMMING APPARATUS

(76) Inventor: Robert John Rockwell, 61 Jupiter Cir., Violet, LA (US) 70092

( * ) Notice: Subject to any disclaimer, the term of this patent is extended or adjusted under 35 U.S.C. 154(b) by 0 days.

(21) Appl. No.: 09/880,548

(22) Filed: Jun. 13, 2001

(51) Int. Cl.[7] .............................................. E02B 15/04
(52) U.S. Cl. ................................. 210/242.3; 210/923
(58) Field of Search ............................ 210/242.3, 523, 210/776, 923, 170

(56) References Cited

U.S. PATENT DOCUMENTS

| | | | |
|---|---|---|---|
| 2,242,861 A | | 5/1941 | Keene |
| 3,536,199 A | * | 10/1970 | Cornelius ................. 210/242.3 |
| 3,576,257 A | | 4/1971 | Yates |
| 3,685,653 A | | 8/1972 | Van Stavern |
| 3,947,360 A | | 3/1976 | Fast |
| 4,013,561 A | | 3/1977 | Murphy |
| 4,173,536 A | | 11/1979 | McCall |
| 4,514,299 A | | 4/1985 | Ayroldi |
| 4,957,636 A | | 9/1990 | Wilson |
| 4,978,448 A | * | 12/1990 | Terokomos .................. 210/923 |
| 5,030,363 A | | 7/1991 | Pole |
| 5,043,064 A | | 8/1991 | Abell |
| 5,200,083 A | * | 4/1993 | Kaylor .................... 210/242.3 |
| 5,380,431 A | | 1/1995 | Newsom |
| 5,427,681 A | | 6/1995 | Weinem |
| 5,522,990 A | | 6/1996 | Davidian |
| 5,618,420 A | | 4/1997 | Stella |

OTHER PUBLICATIONS

Information Disclosure Pursuant to 37 C.F.R. 1.56.

* cited by examiner

*Primary Examiner*—Christopher Upton
(74) *Attorney, Agent, or Firm*—Adams and Reese, LLP (57) ABSTRACT

An oil skimming apparatus for collecting oil from a surface of a water body is provided comprising a floatable hull, a hollow non-floating cylinder rotatably mounted adjacent a bow of the hull, and an arrangement of scrapers and troughs for scraping oil from the inner and outer surfaces of the cylinder and transporting the collected oil to an oil collection tank. The cylinder has port and starboard open ends, which allow oil to collect on the inner surface of the cylinder during rotation. A pair of bulkheads are fixed inside of the cylinder. A pair of pontoons extend fore of the bow of the floatable hull. The pontoons are spaced apart to form an oil collection area. The cylinder is rotatably mounted in the oil collection area via a drive shaft-member passing through the port and starboard bulkheads.

21 Claims, 9 Drawing Sheets

OIL SKIMMING APPARATUS

FIELD OF THE INVENTION

The present invention relates to apparatuses for removing spilled oil from the surfaces of water bodies, and more particularly to apparatuses and methods for removing oil using drum skimmers.

BACKGROUND OF THE INVENTION

When oil is spilled into a water body, such as from a damaged oil tanker, the spilled oil forms a thin film on the surface of the water body. This film is sometimes referred to as an oil slick or sheen. Oil films are detrimental to the marine environment, and will damage shorelines if allowed to drift ashore. The following is a summary of the many different apparatuses and methods have been developed for collecting spilled oil from the surface of water bodies.

The closest known prior art is U.S. Pat. No. 5,030,363 (Pole), which differs significantly from the present invention. Pole describes an oil retrieving vessel having a cylindrically shaped collection surface. Preferably, the cylindrically shaped collecting surface is a drum having closed ends. The drum is preferably watertight and is light weight so that it is buoyant enough to float on the oil alone or on the oil and water. The drum moves up and down with the waves on the water independently of the rest of the vessel. (Col. 3, lines 27–35). Pole mentions that the drum can be set in a fixed vertical position relative to the pontoons, and further mentions that if an open ended drum is used, it can be made of lightweight durable material that will float. (Col. 9, lines 38–42). Pole does not explain how a drum having open ends would be mounted on the vessel. Pole does not teach scrapping of a central baffle or the use of a unitary vessel having an incorporated oil collection tank fixed therein. Nor does Pole suggest that the interior of a hollow cylinder could be scraped. Pole does not disclose a unitary vessel. Rather, Pole discloses a pair of pontoons joined together by cross-members. (Col. 4, lines 5–11). The oil collection tank is separate from the pontoon system, and is changed as needed. (Co. 4, lines 16–30, 58–63). Oil scraped from the outer surface of the drum is diverted directly into a forward end of the separate oil collection tank. (FIG. 3)

The only known prior art that teaches scraping from inner and outer surfaces of a cylinder is U.S. Pat. No. 2,242,861 (Keene). However, Keene relates to an entirely different field of art, namely the filtering of solid matter from a liquid. (Col. 1, lines 1–5). The device of Keene is used in a tank of liquid. Nothing in Keene suggests that the device could be adapted for use on a hull of a floating vessel.

U.S. Pat. No. 5,618,420 (Stella) and U.S. Pat. No. 5,522,990 (Davidian) disclose scraper collection of oil from opposite sides of rotating members, e.g. conveyor belts and rotating disks. U.S. Pat. No. 4,100,072 (Uchida) and U.S. Pat. No. 3,968,041 (De Voss) disclose the use of conveyor drums and conveyor belts for lifting oil from the surface of the body of water.

The use of rotating drums as a means of collecting oil from a surface of a water body is well known. See U.S. Pat. No. 4,173,536 (McCall) (FIG. 4 near element 34), U.S. Pat. No. 3,576,257 (Yates) (element 50), U.S. Pat. No. 5,380,431 (Newsom) (FIG. 11 element 40 or element that is perpendicular to element 42 in FIG. 2).

U.S. Pat. No. 4,013,561 (Murphy), U.S. Pat. No. 3,947,360 (Fast), and U.S. Pat. No. 3,838,775 (Larsson) show roughening the texture of an oil collection drum in order to improve adherence of oil.

An example of an early patent that relates to a method for the separation of oil and water from an emulsion is shown in U.S. Pat. No. 3,685,653. The '653 patent relates to the facilitating and expediting of separation of oil/water emulsions by passing the emulsion as a surface film on a rotating pick up roller into a bight formed by a closely spaced parallel roller arrangement to coalesce the oil particles, break up the emulsion and liberate free oil.

A system for removing floating oil from water is shown in U.S. Pat. No. 3,850,807 issued to Loyd Jones. The invention relates to water pollution control and especially concerns a system for removing dispersed oil from a floating inland stream. A bed of granular sulfur is provided within a unique container buoyantly supported by the stream. In most oily streams the oil, due to gravity, accumulates on the surface in a very thin film, sometimes referred to as an oil slick or sheen. This top portion of the stream is directed through the bed of granular sulfur where the oil is coalesced and removed, leaving clean water flowing from the container.

The Ayers, et al, Pat. No. 3,959,136 relates to a method and apparatus for removing oil from a surface of a body of water with a skimmer, the apparatus including a skimmer with baffled entry ports arranged on a plane inclined to the direction of current flow or about the periphery of a drum so that oil enters through the baffles into a chamber which is beneath an inverted funnel or within the axle of the drum; the method involving providing a skimmer having submerged baffle entry ports inclined to the direction of a current flow, allowing the oil to enter the skimmer, and returning the skimmer to a horizontal position for removal of the oil therefrom through an inverted funnel suspended over the confined oil.

A method and apparatus for pollutant spill control is disclosed in U.S. Pat. No. 4,234,420. The apparatus includes an aquatic vessel comprising a buoyant storage tank, a rotatable cylinder mounted on the tank normal to the relative flow of the aquatic body, a plurality of magnetic bands mounted circularly about the drum and parallel relation.

The Morris Pat. No. 4,360,429 discloses an apparatus for recovering fluids floating on a body of water. The apparatus comprises a support structure and two rows of discs mounted on the support structure so that the discs are in contact with the fluid. The discs of each row are spaced-apart coaxially along a shaft. There is a motor coupled to the shafts for rotating the shafts and the discs. Wipers contact the sides of the discs for wiping the fluid from the discs as the discs rotate and collect the fluid. The shafts are parallel and spaced-apart a distance such that the discs of the two rows interdigitate.

The Wylie Pat. No. 4,510,054 relates to an oil spill recovery method and apparatus. The method of recovery involves the pumping of an oil/water mixture from a concentration area to a submerged portion of a vertically oriented cylinder, open at both ends, and the separation of the oil from the water in the cylinder. Oil floats to and accumulates on the surface of the water in the cylinder and uncontaminated water flows out through the lower open end of the cylinder. The apparatus includes a collection unit which defines the concentration area within three walls thereof, a recovery unit which follows the collection unit and mounts the cylinder therein, and a submerged pumping unit which carries an oil/water mixture from the concentration area in the collection unit to the cylinder in the recovery unit. There is very little emulsification of the oil in the cylinder and hence there is very efficient separation of the oil from the water.

An apparatus for recovery of oils or other similar pollutants floating on bodies of water is disclosed in the Ayroldi Pat. No. 4,514,299. The recovery unit includes two large rotating horizontal axis drums surrounded on the lateral and the rear sides of an apron to contain the floating oils, and is towed by a support vessel to float independently.

An oil recovery vessel is the subject of U.S. Pat. No. 5,047,156. The vessel admits oily water through bow openings to sluiceway and an adjustable height weir for skimming oil, debris and other pollutants from the sea water.

U.S. Pat. No. 5,049,287 discloses an oil spill recovery method and apparatus.

U.S. Pat. No. 5,314,618 discloses a single drum skimmer and weir skimmer for recovering all types of oil from the surface of a body of water. An aluminum high density polyethylene lined drum, floated by adjustable pontoons is rotated clockwise by a hydraulic drive motor, thus drawing the oil layer on top of the water, under and over the drum to a high density polyethylene scraper blade where it is scraped off into a collection box. The oil runs to the corners of a collection box where it is suctioned off through suction hoses to a camlock "tee" fitting. The oil travels through a main suction hose to a peristaltic master pump which provides suction and discharge of oil from the skimmer to a vacuum dehydrator. An open topped, adjustable reservoir/weir collector has an opening in the front panel which may be opened for weir skimming, and closed for drum skimming.

U.S. Pat. No. 5,380,431 provides an oil recovery system for recovering oil spilled upon a body of water. Oil accumulators having numerous open ended cells that entrain spilled oil upon the surfaces of the cells when partially submerged in an area where oil has been spilled upon water. The oil accumulators are rotated so as to lift the oil entrained upon the cell surfaces from the water. An oil remover may have super heated steam nozzles located immediately above the oil accumulator. When oil-bearing cells pass beneath the nozzles, super heated steam may warm and expel the oil from the cells. An oil collector collects the oil removed by the oil remover where gravity flow transports the oil to a storage reservoir.

U.S. Pat. No. 5,609,755 provides an apparatus that takes advantage of the adherence of hydrocarbonates to specific material and its fluidity as influenced by the temperature. The performances of the apparatus are related to the interaction of two horizontal concentric cylinders one rotating around the other and containing both collecting and recovery means, working simultaneously. A three way oil collection is achieved by the cylinder's exterior surfaces, by large conical discs and by oil scoops located between the two cylinders. Said collecting means are integrated with a central heating system and with temperature controlled recovery devices such as oil deflectors with scrapers and oil recovery reservoir with screw, so that any type of oil can be recovered efficiently from or near the water surface even in cold weather.

U.S. Pat. No. 5,685,979 discloses an oil skimming device that includes a pair of hulls between which is suspended a skimmer box containing a plurality of oleophilic discs. The skimmer box has an outwardly opening bottom door which promotes a draft of water through the skimmer box when the device is in forward motion. Alternately the device can be operated in a stationary mode wherein water is evacuated from the skimmer box by means of a stand pipe inside the box. The skimmer box and oleophilic disc array are demountable and the pair of hulls can be folded together for transportation.

U.S. Pat. No. 5,522,990 discloses an oil removal device for separating floating oils from water or water-based liquids. A rotating disk lifts viscous oils from the water or water-based liquid. The oil is removed from the side by wiper blades on either side of the disk on the downward part of the disk's travel. The oil then falls into channels and is channeled into a storage container. A support frame comprising a base and a center post attached to the base is connected to and supports the disk, wiper blades and channels. A gravity separating chamber could be used in place of the storage container. Water collected by the disk is diverted from the oil by a small scale gravity separator module. The gravity separator module includes a weir having a gap or space at the bottom to separate the water from the oil.

U.S. Pat. No. 2,242,861 discloses a rotary filter, a rotary drum-type filer wherein the drum carries a filter media and rotates within a tank containing the liquor from which solid matter is to be separated. The drum consists of a cylindrical shell on the periphery of which is formed an annular compartment by the super position of a filter cloth or other filter medium. The cloth is virtually is in the form of an endless band which is supported annularly drum shell by suitable means and the annular chamber so formed and in some cases is divided into a number of smaller compartments. Scraper blades on both the inside and outside of the drum are employed to remove the precipitate from the outer face of the rotor and from the inner face of the rotor.

Although many efforts have been made to provide efficient and effective surface oil collection devices, many of these devices have had only limited success. There thus remains a need for an oil skimming apparatus that meets the following objects and has the following characteristics.

OBJECTS AND SUMMARY OF THE INVENTION

It is an object of the invention to provide an oil skimming apparatus that offers significantly improved oil collection rates and efficiencies over the prior art.

It is an object of the invention to provide an oil skimming apparatus that provides for collection of oil from the outer and inner surfaces of a hollow, non-floating cylinder.

It is another object of the invention to provide a scraper type oil skimming apparatus that facilitates replacement of scraper blades.

It is another object of the invention to provide an oil skimming apparatus that can operate efficiently in high currents.

It is yet another object of the invention to provide an oil skimming apparatus that can operate efficiently in rough sea states and in other hazardous conditions.

It is still another object of the invention to provide an oil skimming apparatus that can be used for coastal, offshore, and oil pit separators.

These and other objects and advantages of the invention shall become apparent from the following general and preferred description of the invention.

Accordingly, an oil skimming apparatus for collecting oil from a surface of a water body is provided comprising, generally, a floatable hull, a hollow cylinder rotatably mounted adjacent a bow of the hull, and an arrangement of scrapers and troughs for scraping oil from the inner and outer surfaces of the cylinder and transporting the collected oil to an oil collection tank. The oil collection tank is preferably fixed within the hull. A suction outlet is preferably provided for use in pumping collected oil from the oil collection tank. The cylinder has port and starboard open ends and a density greater than water. Because the cylinder has open ends and a density greater than water, it cannot float on a surface of a water body without external support. The cylinder also has at least a pair of bulkheads, namely a port bulkhead and a starboard bulkhead. The bulkheads are fixed in spaced apart relation within the cylinder. The bulkheads are preferably spaced about 30 cm apart. Spacing the bulkheads apart provides greater support for a drive shaft (described below). However, if the bulkheads are spaced too far apart, less inner surface is available for collection of oil, decreasing oil collection recovery. The cylinder is also preferably provided with an annular shoulder depending inward from each of the open ends of the cylinder. The annular shoulders of the cylinder are preferably wiped of oil by the inner scraper blades during use.

A pair of pontoons, namely a port and starboard pontoon, extend fore of the bow of the floatable hull. The pontoons are spaced apart to form an oil collection area. The cylinder is rotatably mounted in the oil collection area via a drive shaft-member passing through the port and starboard bulkheads. A lengthwise annular collar preferably passes through the pair of bulkheads to provide further support for the drive shaft. The drive shaft passes through the annular collar. The drive shaft preferably has an outer diameter of about 4 to 6 inches (10 to 15 cm) to thereby increase the strength and rigidity of the drive shaft. A rotational axis of the cylinder is aligned substantially parallel to the surface of the water body and substantially perpendicular to a centerline of the floatable hull. Additionally, a bottom edge of the open ended cylinder is positioned below a waterline of the floatable hull, such that oil and water on the surface of the water body spill into the interior of the cylinder. A drive means is provided for selectively rotating the drive shaft.

A series of oil collection troughs and scraper blades are arranged inside and outside of the cylinder to permit collection of oil from the cylinder. An outer oil collection trough is mounted along a fore outer surface of the cylinder. An outer scraper blade is positioned to scrape oil from the fore outer surface of the cylinder and to divert the scraped oil into the outer oil collection trough. A port inner oil collection trough is mounted along a fore inner surface of the cylinder between the port bulkhead and the port open end. A port inner scraper blade is positioned to scrape oil from the fore inner surface of the cylinder and to divert the scraped oil into the port inner oil collection trough. Similarly, on the other side of the vessel, a starboard inner oil collection trough is mounted along the fore inner surface of the cylinder between the starboard bulkhead and the starboard open end. A starboard inner scraper blade is positioned to scrape oil from the fore inner surface of the cylinder and to divert the scraped oil into the starboard inner oil collection trough. Because oil also collects on the internal bulkheads of the cylinder, a port bulkhead scraper blade can be positioned to scrape oil from the port bulkhead and to divert the scraped oil into the port inner oil collection trough. Likewise, a starboard bulkhead scraper blade can be positioned to scrape oil from the starboard bulkhead and to divert the scraped oil into the starboard inner oil collection trough.

A port oil transfer trough is positioned and configured to transfer oil from the outer oil collection trough and the port inner collection trough to the oil collection tank. Similarly, a starboard oil transfer trough is positioned and configured to transfer oil from the outer oil collection trough and the starboard inner collection trough to the oil collection tank. A valve is preferably provided in each of the oil transfer troughs for selectively shutting off flow of collected oil to the collection tank. The oil collection troughs preferably decline outboard and the oil transfer troughs preferably decline aft to thereby facilitate flow of collected oil to the oil collection tank. During collection of oil, solid debris can clog up the troughs, causing oil to spill out rather than drain into the oil collection tank. Accordingly, in a preferred embodiment the port and the starboard oil transfer troughs are recessed below a deck of the pontoons and the hull, such that the deck prevents solid debris from falling into the troughs.

The scraper blades preferably consist of ultra high molecular weight plastic ("UHMW"), but can alternatively be made of rubber, plastic, or other semi-rigid durable materials. Each of the scraper blades is preferably set at an angle of between 10 to 70 degrees relative to the surface of the body of water. In a most preferred embodiment, the scraper blades are set at an angle of between 45 to 55 degrees relative to the surface of the body of water. The various scrapers can be set at different angles from one another.

Another objective of the invention is to facilitate the changing of scraper blades, which tend to wear out during use and thus require replacement. The port and starboard oil transfer troughs are preferably positioned substantially level with the rotational axis of the cylinder, to thereby facilitate changing of scraper blades by providing a relatively large opening between the transfer troughs and a top edge of the cylinder. The port and starboard transfer troughs can be placed above the rotational axis of the cylinder without affecting the amount of oil collected; however, if the troughs are placed too close to the top of the cylinder, it becomes necessary to remove the troughs in order to change the wiper blades, which can cost several days of down time. To further facilitate access for changing of scraper blades, the cylinder can be provided with an inner diameter of three to six feet or more. A larger cylinder also allows the apparatus of the invention to collect oil in high sea states. The inner and outer surfaces of the cylinder preferably have a scratch surface to thereby improve adhesion of oil to the surfaces.

Such devices are often used in rivers and inland channels, where underwater hazards can puncture a hull can cause leakage of collected oil. Accordingly, the hull preferably has a double bottom to thereby prevent leakage of oil from the collection tank. The device is preferably built from high-grade aluminum.

The apparatus can also be provided with a cylinder cover pivotally connected to a deck of the hull adjacent the oil collection area. The cylinder cover is positioned and configured to cover the cylinder when pivoted to a closed position to thereby protect the cylinder, and to provide access to the cylinder when pivoted to an open position to thereby facilitate cleaning and maintenance of the cylinder. A front screen is preferably mounted fore the cylinder to thereby prevent trash from getting on the cylinder.

In a preferred embodiment, the hull has a tapered bow. The tapered bow is separated from the oil collection tank via an internal bulkhead. The internal bulkhead prevents oil from collecting in the tapered bow, which prevents the hull from listing forward during collection of oil.

PREFERRED EMBODIMENTS OF THE INVENTION

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
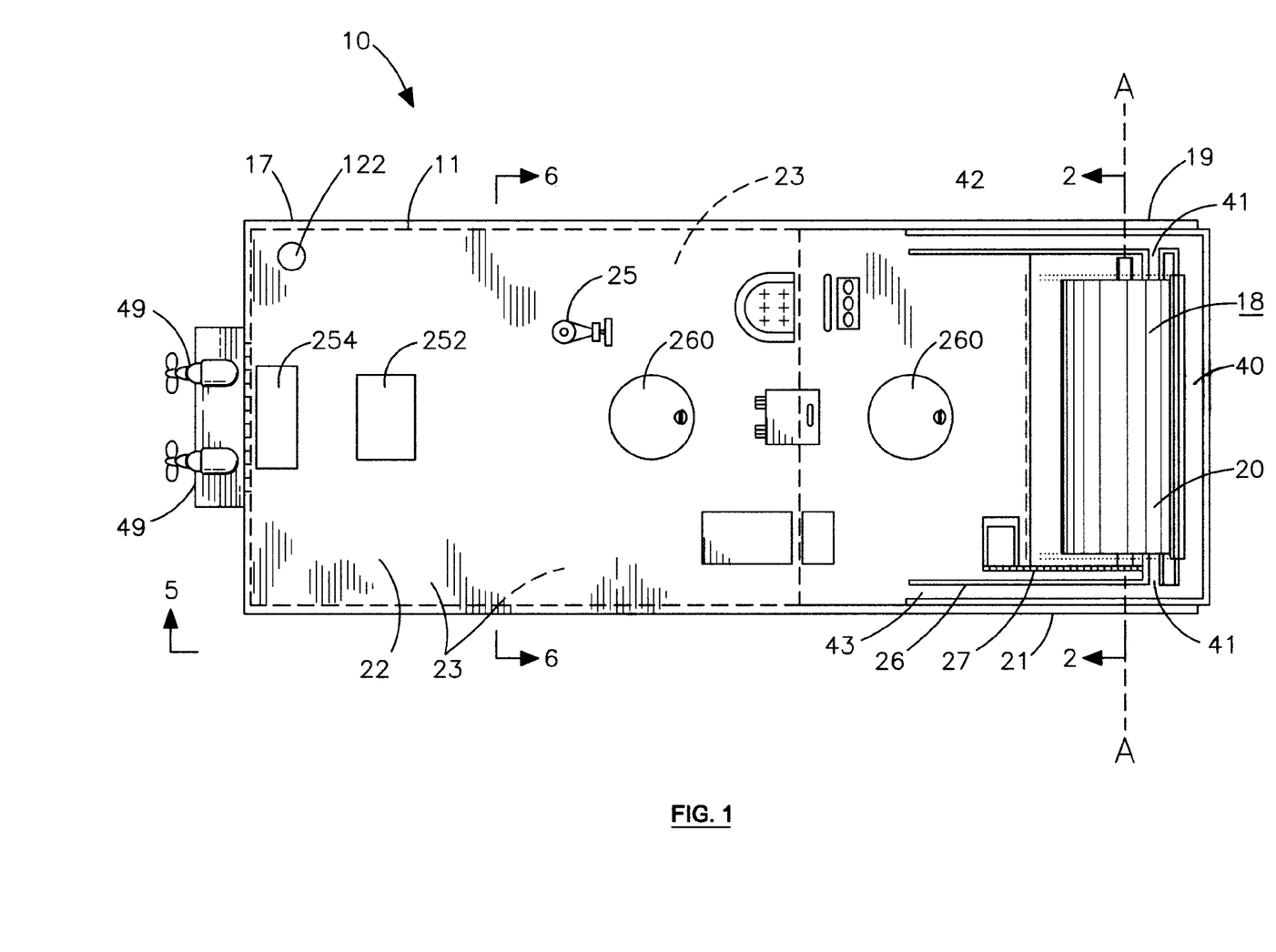
FIG. 1 is a top plan view of one preferred embodiment of the apparatus of the present invention.

As shown in FIG. 1, the oil skimming apparatus 10 for collecting oil from a surface 12 of a water body comprises, generally, a floatable hull 11, a hollow cylinder 20 rotatably mounted adjacent a bow of the hull 11, and an arrangement of scrapers 50, 51P, 51S and troughs 40, 41P, 41S, 42, 43 for scraping oil from the inner 39 and outer 39 surfaces of the cylinder 20 and transporting the collected oil to an oil collection tank 22. The oil collection tank 22 is preferably fixed within the hull 11. A suction outlet 122 is preferably provided for use in pumping collected oil from the oil collection tank 22.

Figure 5:
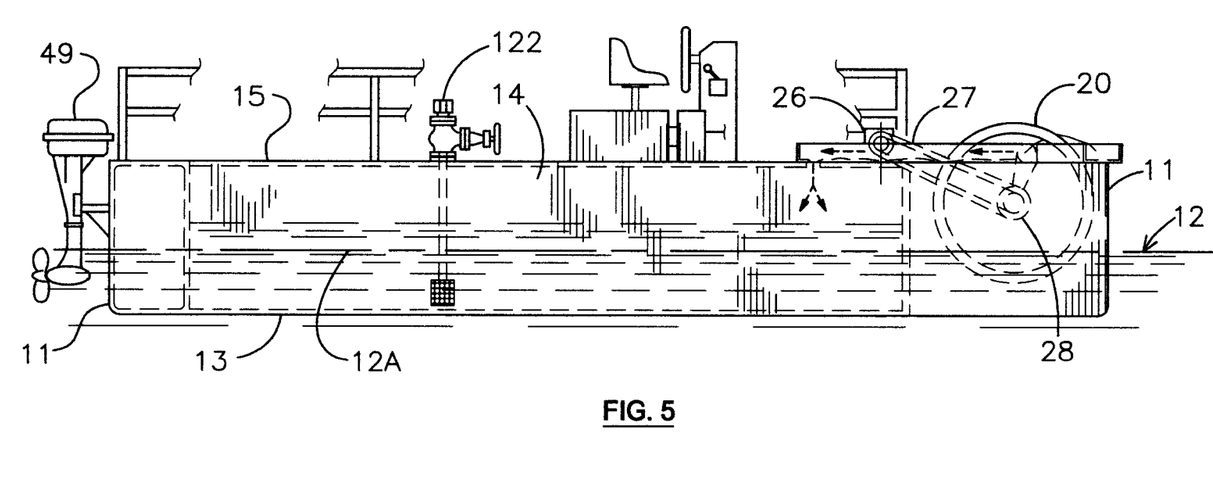
FIG. 5 is a side cross-section view of one preferred embodiment of the apparatus of the present invention, showing the oil collection and transfer troughs in an elevated position relative to the cylinder.
Figure 6:
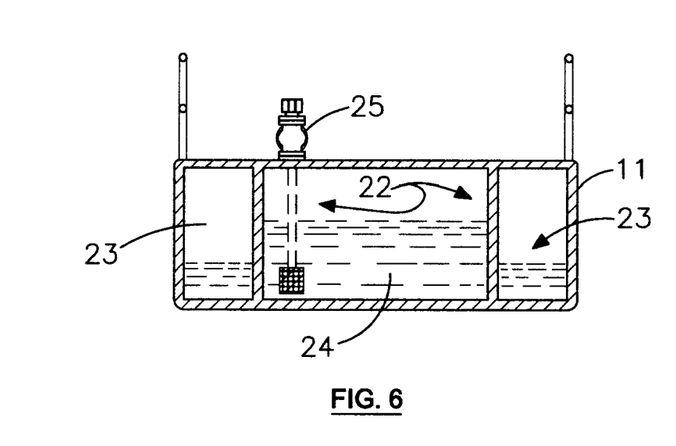
FIG. 6 is a sectional view taken along lines 6—6 of FIG. 1.

As shown in FIGS. 1 and 5, the hull 11 includes an upper portion 14 that includes a deck and a submerged portion 13. The hull 11 provides a bow end portion 16 and a stern end portion 17. The bow end portion 16 supports a rotating hollow cylinder 20. The hollow cylinder 20 is rotatably disposed at the bow 16 portion of hull 11 generally in between port and starboard appendages or pontoons 19, 21. The stern portion 17 supports propulsion units such as outboard engines 49 or the like. The bow 16 has an open socket 18 spanned by a pair of generally parallel appendages including the port appendage 19 and starboard appendage 21. As shown in FIG. 6, the hull 11 provides an interior 22 and one or two ballasting tanks 23. Interior collection tank 22 is used to hold a volume of collected oil 24. FIG. 6 also shows a transfer pump 25.

The cylinder 20 has port 52 and starboard 53 open ends and a density greater than water. Because the cylinder 20 has open ends 52, 53 and a density greater than water, it cannot float on a surface 12 of a water body without external support. In a preferred embodiment, the cylinder 20 is built of solid marine grade aluminum, and therefore is very heavy. In order to support the heavy cylinder 20 on a drive shaft-member 30 (described below), the cylinder 20 also has at least a pair of bulkheads, namely a port bulkhead 35P and a starboard bulkhead 35S. The bulkheads 35P, 35S are preferably circular plates 35. The bulkhead plates 35P, 35S can be welded, for example, at a periphery 36 to inside surface 39 of cylinder 20. The bulkheads 35P, 35S are fixed in spaced apart relation within the cylinder 20. The bulkheads are preferably spaced about 30 cm apart. Spacing the bulkheads apart provides greater support for a drive shaft (described below), minimizing non-axial rotation of the cylinder 20. However, if the bulkheads 35P, 35S are spaced too far apart, less inner surface is available for collection of oil, decreasing oil collection efficiency.

Figure 2:
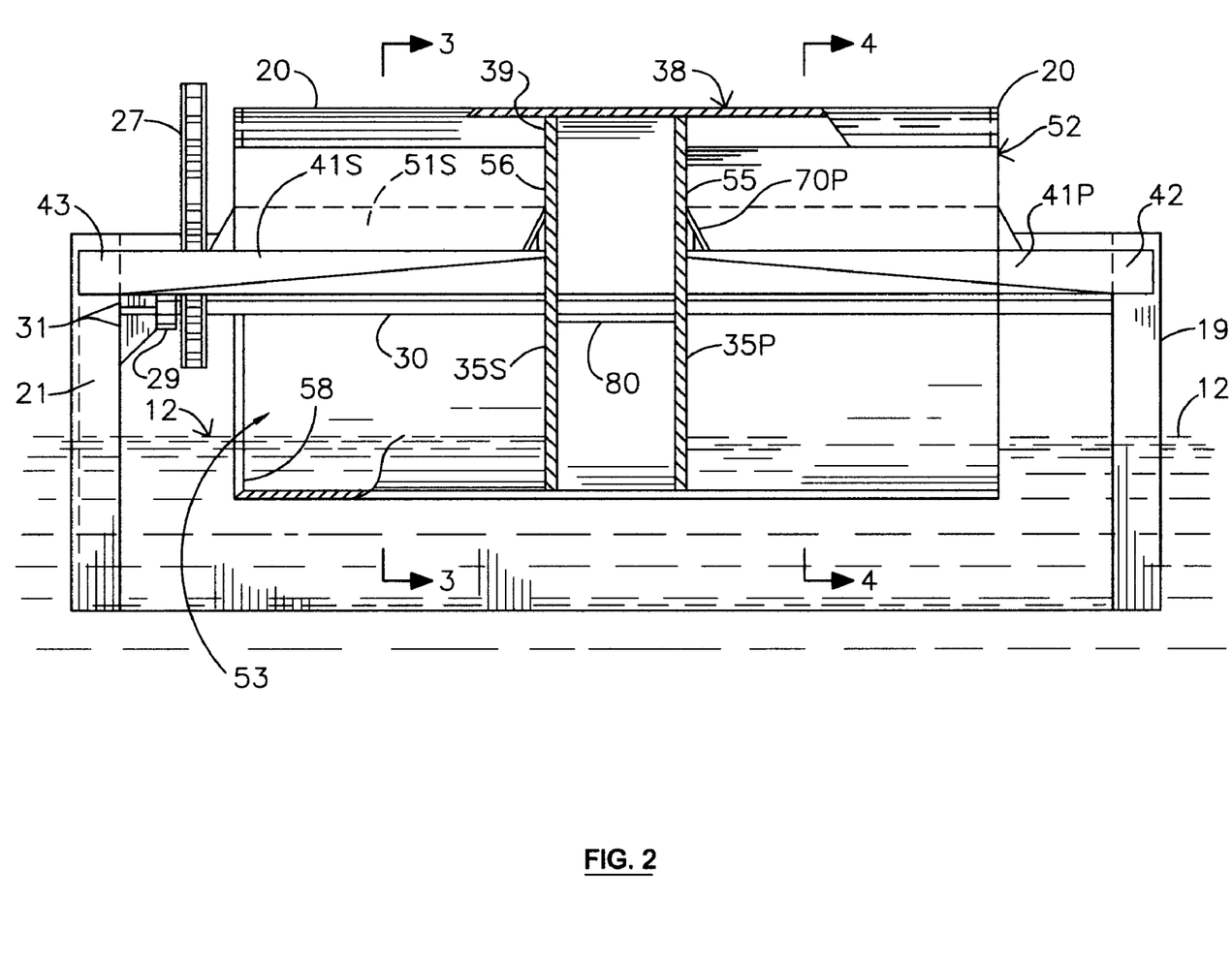
FIG. 2 is a front cross-section view taken along lines 2—2 of FIG. 1.

As shown in FIGS. 1 and 2, a rotational axis A of the cylinder 20 is aligned substantially parallel to the surface of the water body and substantially perpendicular to a centerline of the floatable hull 11. Additionally, a bottom edge of the cylinder 20 is positioned below a waterline of the floatable hull 11, such that oil and water on the surface 12 of the water body spill into the interior 54 of the cylinder 20. Oil appears to adhere to the inner surface 39 of the cylinder 20 more than to the outside surface 38. This may be due to centrifugal force. Experiments by the inventor indicate that the apparatus can pickup five times more oil inside the cylinder 20 than outside the cylinder.

Figure 11:
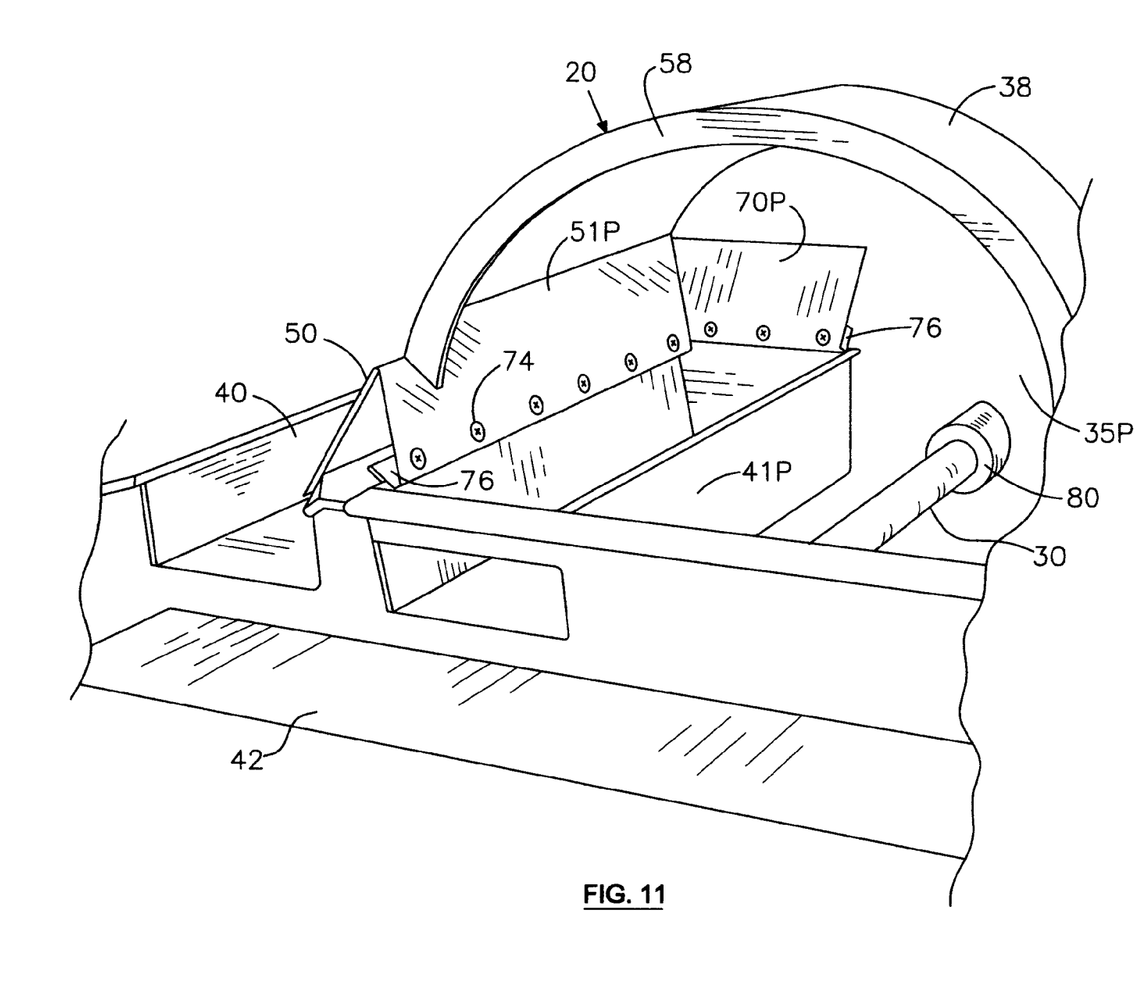
FIG. 11 is side perspective view of one preferred embodiment of the invention showing details of a preferred UHMW scraper arrangement.

The cylinder is also preferably provided with an annular shoulder 57, 58 depending inward from each of the open ends 52, 53 of the cylinder 20. The annular shoulders 57, 58 help retain oil within the interior 54 of cylinder 20 as cylinder 20 rotates. As shown in FIG. 11, the annular shoulders 57, 58 of the cylinder 20 are preferably wiped of oil by the inner scraper blades 51P, 51S during use.

Figure 7:
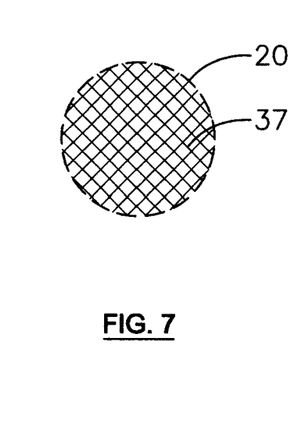
FIG. 7 is a fragmentary view of the cylinder portion of one preferred embodiment of the present invention, showing scratch surfacing in representational format.

The rotating cylinder 20 provides an outer convex surface 38 and an inner concave surface 39. In a preferred embodiment, the inner 39 and outer 38 surfaces of the cylinder 20 have a scratch surface 37 (shown in representational form in FIG. 7). A scratch surface is created by sanding the surfaces to create a microscopic texture. An appropriate scratch surface can be obtained by sanding the cylinder 20 with Teflon Scotch Brite Metal Conditioner. A scratch surface makes more oil adhere to the inner and outer surfaces of the cylinder 20 as the cylinder 20 rotates toward the scrapers, improving the amount of oil that can be scraped by the scrapers. This principle is used in the piston cylinders of internal combustion engines, the inner surface of which is textured with a type of scratch surface known as "cross-hatching."

A pair of pontoons, namely a port 19 and starboard 21 pontoon, extend fore of the bow of the floatable hull 11. The pontoons 19, 21 are spaced apart to form an oil collection area 18. The cylinder 20 is rotatably mounted in the oil collection area 18 via a drive shaft-member 30 passing through the port 35P and starboard 35S bulkheads. A lengthwise annular collar 80 preferably passes through the pair of bulkheads 35P, 35S to provide further support for the drive shaft member 30. The drive shaft member 30 passes through the annular collar 80. The drive shaft-member 30 preferably has an outer diameter of about 4 to 6 inches (10 to 15 cm) to thereby increase the strength and rigidity of the drive shaft member 30.

A drive means 26–28 is provided for selectively rotating the drive shaft 30. The device of the present invention preferably uses a drive engine (e.g. diesel, gas, electric, hydraulic, etc.) for rotating the cylinder 20. The cylinder 20 can be driven with motor drive 26, sprocket 28, and chain 27. The drive system for the cylinder 20 can use a gear reduction. The cylinder 20 can turn on flange or pillar block bearings with a chain or direct drive. An hydraulic motor (e.g. 10 HP) can be used as the drive means 26. An hydraulic motor is safer because it permits the drive chain to be eliminated. A hydraulic motor can also be provided with a speed control for varying the speed of rotation of the cylinder 20.

A series of oil collection troughs 40, 41P, 41S, 42, 43 and scraper blades 50, 51P, 51S, 70P, 70S are arranged inside and outside of the cylinder 20 to permit collection of oil from the cylinder 20. An outer oil collection trough is mounted along a fore outer surface of the cylinder 20. An outer scraper blade 50 is positioned to scrape oil from the fore outer surface 38 of the cylinder 20 and to divert the scraped oil into the outer oil collection trough 40. A port inner oil collection trough 41P is mounted along a fore inner surface 39 of the cylinder 20 between the port bulkhead 35P and the port open end 52. A port inner scraper blade 51P is positioned to scrape oil from the fore inner surface 39 of the cylinder 20 and to divert the scraped oil into the port inner oil collection trough 41P. Similarly, on the other side of the vessel 10, a starboard inner oil collection trough 41S is mounted along the fore inner surface 39 of the cylinder 20 between the starboard bulkhead 35S and the starboard open end 53. A starboard inner scraper blade 51S is positioned to scrape oil from the fore inner surface 39 of the cylinder 20 and to divert the scraped oil into the starboard inner oil collection trough 41S. Because oil also collects on the internal bulkheads 35P, 35S of the cylinder 20, a port bulkhead scraper blade 70P can be positioned to scrape oil from the port bulkhead 35S and to divert the scraped oil into the port inner oil collection trough 41P. Likewise, a starboard bulkhead scraper blade 70S can be positioned to scrape oil from the starboard bulkhead 35S and to divert the scraped oil into the starboard inner oil collection trough 41S.

A port oil transfer trough 42 is positioned and configured to transfer oil from the outer oil collection trough 40 and the port inner collection trough 41P to the oil collection tank 22. Similarly, a starboard oil transfer trough 43 is positioned and configured to transfer oil from the outer oil collection trough 40 and the starboard inner collection trough 41S to the oil collection tank 22. A valve 142 is preferably provided in each of the oil transfer troughs 42, 43 for selectively shutting off flow of collected oil to the collection tank 22. The oil collection troughs 40, 41P, 41S preferably decline outboard and the oil transfer troughs 42, 43 preferably decline aft to thereby facilitate flow of collected oil to the oil collection tank 22.

Figure 3:
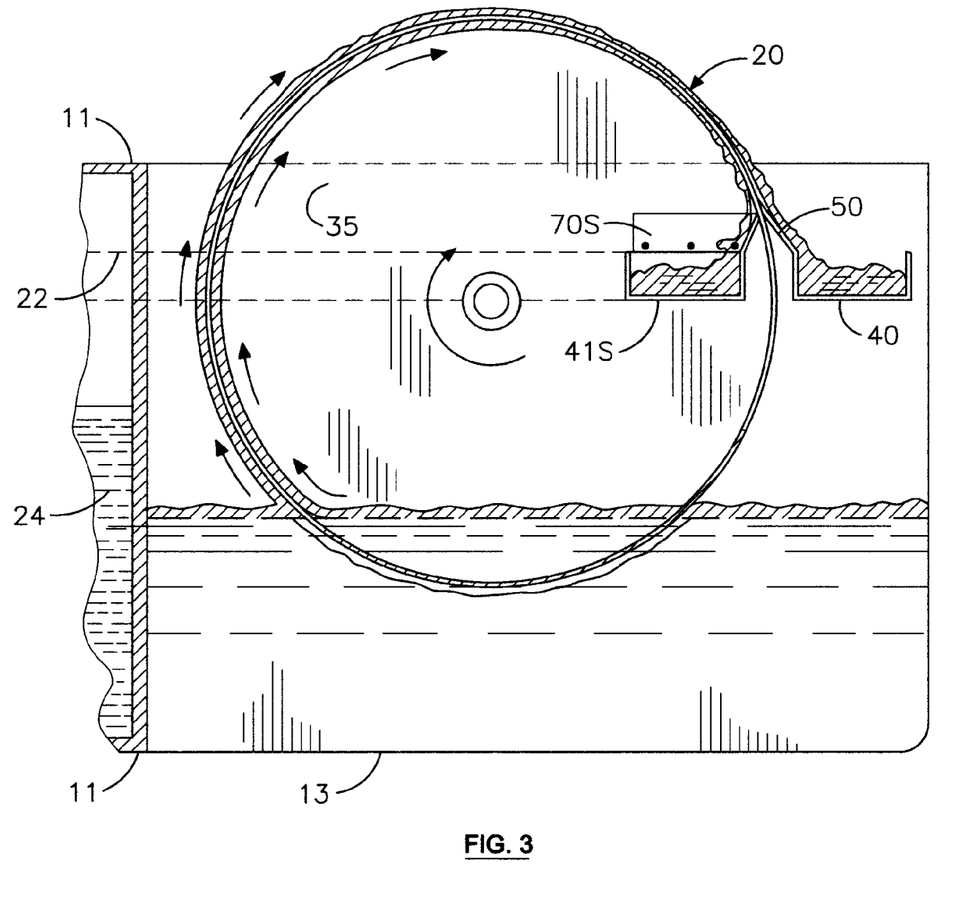
FIG. 3 is a side cross-section view taken along lines 3—3 of FIG. 2.
Figure 4:
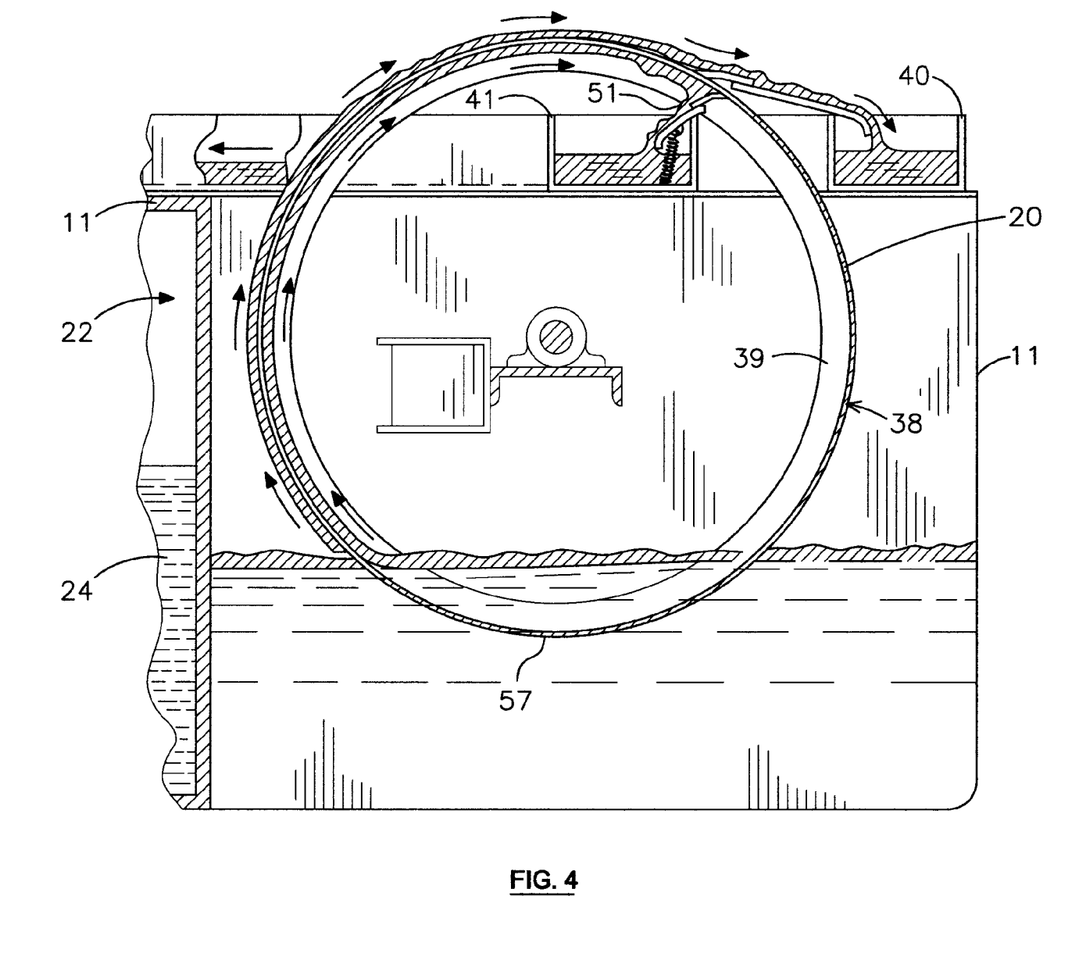
FIG. 4 is a side cross-section view similar to FIG. 3, but showing the oil collection troughs and scrapers in an elevated position relative to the cylinder.

During collection of oil, solid debris can clog up the troughs, causing oil to spill out rather than drain into the oil collection tank 22. Accordingly, in a preferred embodiment shown in FIG. 3, the port and the starboard oil transfer troughs 42, 43 are recessed below a deck of the pontoons 19, 21 and the hull 11, such that the deck prevents solid debris from falling into the troughs 42, 43.

The scraper blades 50, 51P, 51S, 70P, 70S preferably consist of UHMW, which provides a particularly durable and effective scraper. Alternatively, the blades can be made of rubber, plastic, or other semi-rigid durable materials. Each of the scraper blades is preferably set at an angle of between 10 to 70 degrees relative to the surface of the body of water. In a most preferred embodiment, the scraper blades are set at an angle of between 45 to 55 degrees relative to the surface of the body of water. When using low angles on the exterior and scraping light weight oils, the cylinder has a tendency to sling oil. The various scrapers can be set at different angles from one another. For example, the outer scraper blade 50 might be set at 50 degrees while the inner blades 51P, 51S are set at 65 degrees.

Another objective of the invention is to facilitate the changing of scraper blades 50, 51P, 51S, 70P, 70S, which tend to wear out during use and thus require replacement. The port and starboard oil transfer troughs 42, 43 are preferably positioned substantially level with the rotational axis A of the cylinder 20, to thereby facilitate changing of scraper blades by providing a relatively large opening between the transfer troughs 42, 43 and a top edge of the cylinder 20. The port and starboard transfer troughs 42, 43 can be placed above the rotational axis A of the cylinder 20 without affecting the amount of oil collected; however, if the troughs 42, 43 are placed too close to the top of the cylinder 20, it becomes necessary to remove the troughs 42, 43 in order to change the wiper blades, which can cost several days of down time. To further facilitate access for changing of scraper blades 50, 51P, 51S, 70P, 70S, the cylinder 20 can be provided with an inner diameter of three to six feet (90 to 180 cm) or more. A larger cylinder 20 also allows the apparatus of the invention 10 to collect oil in high sea states.

The scrapers 50, 51P, 51S, 70P, 70S can be secured to an upwardly extending lip-member 76 of the troughs with bolts or screws 74, as shown most clearly in FIG. 11. This embodiment firmly compels the scraper blades against the surfaces of the cylinder 20 and bulkheads 35P, 35S such that oil contacting the blades during rotation of the cylinder 20 passes over the blades and into the collection troughs. This embodiment also makes it relatively easy to replace the blades simply by releasing the bolts or screws 74.

Figure 8:
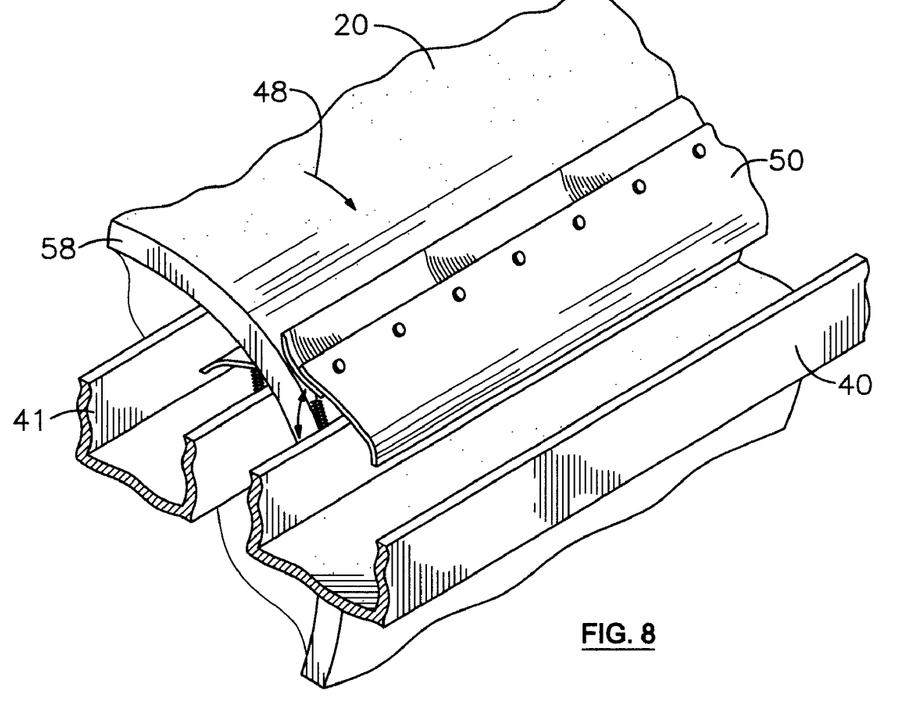
FIG. 8 is a fragmentary perspective view of one preferred embodiment of the apparatus of the present invention illustrating the cylinder, front wiper, and portions of the channel.
Figure 9:
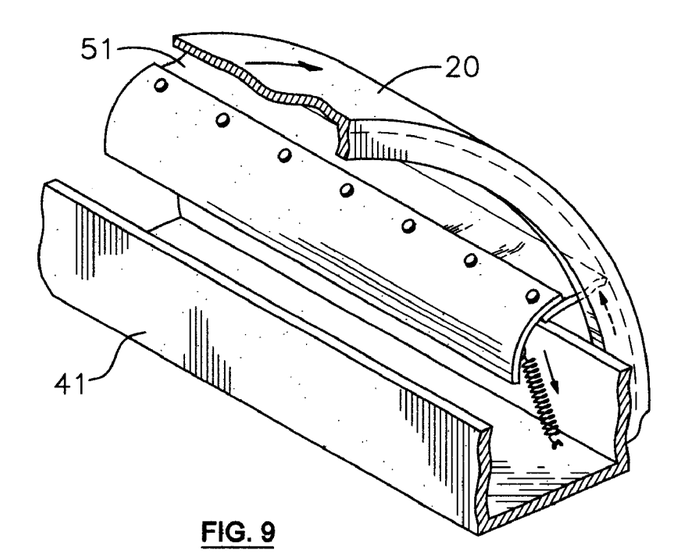
FIG. 9 is a fragmentary perspective view of the one preferred embodiment of the apparatus of the represent invention illustrating the cylinder, inside surface wiper, and a portion of the channel.

FIGS. 8 and 9 show an alternative scraper embodiment in which the scrapers 50, 51P, 51S are constructed of a metallic body with a rubber or polymeric wiper member affixed thereto by bolting for example. In FIG. 8, the outside channel section 40 is shown positioned under outside wiper 50. The outside wiper 50 includes a metallic frame 61 and an elongated polymeric or rubber member 62. In FIG. 9, inside wiper 51 has a metal body 63 and an elongated rubber wiper member 64. Each of the wipers 50, 51 can be pivotally mounted upon a piano hinge 65 (see FIG. 8). Each of the wipers 50, 51 can also be provided with springs for urging the rubber or polymeric wiper 62, 64 into engagement with the respective surfaces of cylinder 20. Springs 66 are shown in FIGS. 8 and 9.

Such devices are often used in rivers and inland channels, where underwater hazards can puncture a hull can cause leakage of collected oil. Accordingly, the hull 11 preferably has a double bottom 211 to thereby prevent leakage of collected oil 24 from the collection tank 22, as shown in FIG. 10.

The apparatus can also be provided with a cylinder cover 220 pivotally connected to a deck of the hull 11 adjacent the oil collection area 18. The cylinder cover 220 is positioned and configured to cover the cylinder 20 when pivoted to a closed position to thereby protect the cylinder 20, and to provide access to the cylinder 20 when pivoted to an open position to thereby facilitate cleaning and maintenance of the cylinder 20. A front screen 300 is preferably mounted fore the cylinder 20 to thereby prevent trash from getting on the cylinder 20.

Figure 10:
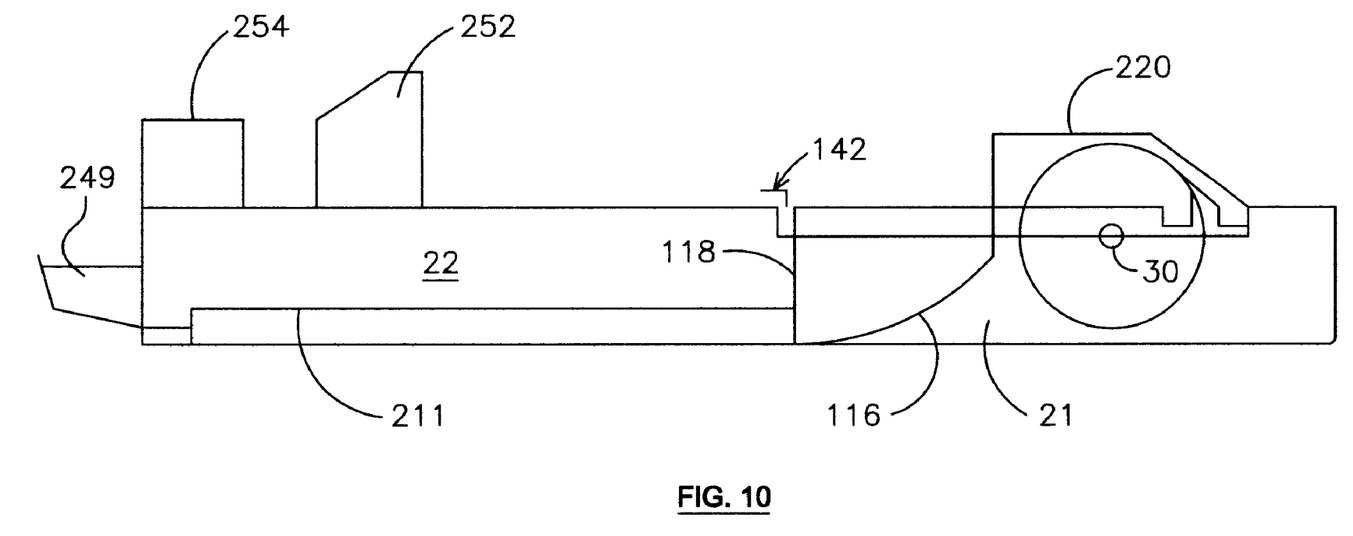
FIG. 10 is a side cross-section view of one preferred embodiment of the invention showing a preferred hull configuration.

In a preferred embodiment shown in FIG. 10, the hull 11 has a tapered bow 116. The tapered bow 116 is separated from the oil collection tank 22 via an internal bulkhead 118. The internal bulkhead 118 prevents oil from collecting in the tapered bow 116, which prevents the hull 11 from listing forward during collection of oil.

The floatable hull 11 preferably includes a displacement tank. The hull 11 can include wing tanks and a fore and aft ballast system. The tanks are ballasted so as to keep the vessel floating at desired levels relative to the surface 12 of the water body. The vessels of the present invention can also be provided with spud guide set ups. The spud guide can be used to hold vessels at desired locations, and can further be used to change or control the elevation of the hull 11 relative to the surface 12 of the water body. The oil collection tank 22 can be provided with a level control to pump off runoff automatically.

The apparatus of the present invention 10 can be constructed of any hard material, such as aluminum, stainless steel, fiberglass, carbon fiber, etc. The apparatus 10 is preferably constructed from high grade aluminum, such as 5086 marine grade aluminum.

The oil skimmer apparatus of the present invention 10 can be fabricated of aluminum with a center spreader frame. The spreader frame can be welded to a load collar with gussets, thus supporting the cylinder 20. This leaves the ends of the cylinder 20 open. Wipers and a trough are inserted from each open end of the cylinder 20 and welded or bolted into place.

A plurality of the double bulkhead cylinders can be arranged on a bow of a large floating vessel, such as a barge, utilizing the teachings of the invention.

Figure 12:
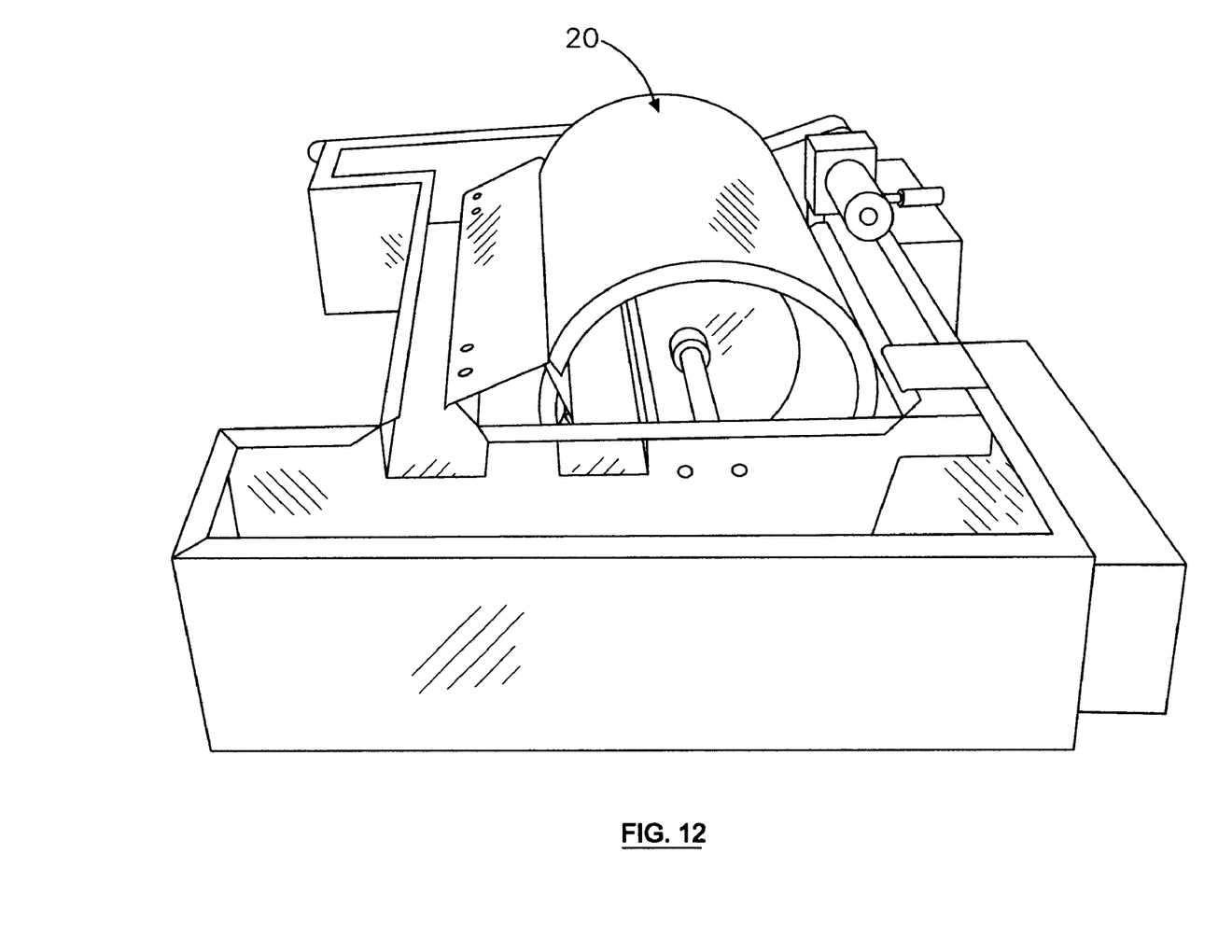
FIG. 12 is a side perspective view showing an application of the principles of the invention to a floating pit skimmer.

FIG. 12 is a side perspective view showing an application of the principles of the invention to a floating pit skimmer. The pit skimmer differs primarily in that it is not fixed to a vessel having an oil collection tank. When oil is collected by the pit skimmer, the oil is pumped into an oil collection tank, such as a barge or an oil tanker truck. Pit skimmers are particularly effective in pools and shallow areas where a large oil skimmer may be unmaneuverable.

In operation, the propulsion motors 49 are used to drive the oil skimming apparatus 10 of the invention into an oil spill. The drive means 26–28 is then selectively operated to thereby turn the cylinder 20 and collect spilled oil, in the manner described above. Once the oil collection tank 22 is filled with oil, the apparatus is driven to an oil collection area, such as an oil tanker or truck, where the collected oil is pumped from the collection tank 22. Once the collected oil has been pumped out, the apparatus 10 can be driven back to the oil spill to collect more oil. Alternatively, the device can be anchored in one location, such as by using an anchor or spuds, and collected oil can be pumped from the collection tank 22 during oil collection. The apparatus 10 significantly out-competes the prior art oil skimming and collection devices.

Although the present invention has been described in terms of specific embodiments, it is anticipated that alterations and modifications thereof will no doubt become apparent to those skilled in the art. It is therefore intended that the following claims be interpreted as covering all alterations and modifications that fall within the true spirit and scope of the invention.

What is claimed is:

1. An oil skimming apparatus for collecting oil from a surface of a water body comprising:

a floatable hull, said hull having an oil collection tank therein, a pair of pontoons extending fore of a bow of said floatable hull, said pontoons spaced apart to thereby form an oil collection area therebetween, a hollow cylinder, said cylinder having port and starboard open ends, said cylinder having a density greater than water, a port bulkhead and a starboard bulkhead, said bulkheads fixed in spaced apart relation within said cylinder, said cylinder rotatably mounted in said oil collection area via a driveshaft-member passing through said port and starboard bulkheads, a rotational axis of said cylinder aligned substantially parallel to the surface of the water body and substantially perpendicular to a centerline of said floatable hull, a bottom edge of said cylinder positioned below a waterline of said floatable hull, a drive means for selectively rotating said drive shaft, an outer oil collection trough mounted along a fore outer surface of said cylinder, an outer scraper blade, said outer scraper blade positioned to scrape oil from said fore outer surface of said cylinder and to divert said scraped oil into said outer oil collection trough, a port inner oil collection trough, said port inner oil collection trough mounted along a fore inner surface of said cylinder between said port bulkhead and said port open end, a port inner scraper blade, said port inner scraper blade positioned to scrape oil from said fore inner surface of said cylinder and to divert said scraped oil into said port inner oil collection trough, a starboard inner oil collection trough, said starboard inner oil collection trough mounted along said fore inner surface of said cylinder between said starboard bulkhead and said starboard open end, a starboard inner scraper blade, said starboard inner scraper blade positioned to scrape oil from said fore inner surface of said cylinder and to divert said scraped oil into said starboard inner oil collection trough, a port oil transfer trough, said port oil transfer trough positioned and configured to transfer oil from said outer oil collection trough and said port inner collection trough to said oil collection tank, and a starboard oil transfer trough, said starboard oil transfer trough positioned and configured to transfer oil from said outer oil collection trough and said starboard inner collection trough to said oil collection tank.

2. The apparatus of claim 1, wherein said oil collection tank is permanently fixed in said hull, and further including a suction outlet for use in pumping collected oil from said oil collection tank.

3. The apparatus of claim 1, wherein said scraper blades consist of UHMW.

4. The apparatus of claim 3, wherein said scraper blades are set at an angle of between 45 to 55 degrees relative to the surface of the body of water.

5. The apparatus of claim 1, wherein said port and said starboard oil transfer troughs are recessed below a deck of said pontoons and said hull, such that said deck prevents debris from falling in said troughs.

6. The apparatus of claim 1, wherein said port and starboard oil transfer troughs are positioned substantially level with said rotational axis of said cylinder, to thereby facilitate changing of scraper blades by providing a relatively large opening between said transfer troughs and a top edge of said cylinder.

7. The apparatus of claim 6, wherein said cylinder has an inner diameter of at least 90 cm to thereby allow the apparatus to collect oil in high sea states and to further facilitate changing of scraper blades.

8. The apparatus of claim 1, wherein said inner and outer surfaces of said cylinder have a scratch surface to thereby improve adhesion of oil to said surfaces during collection of oil from the water body.

9. The apparatus of claim 1, wherein said port and starboard bulkheads are spaced at least 30 cm apart.

10. The apparatus of claim 1, further comprising a lengthwise annular collar passing through said pair of bulkheads, said drive shaft passing through said annular collar.

11. The apparatus of claim 1, further comprising a valve in each of said oil transfer troughs for selectively shutting off flow of collected oil to said collection tank.

12. The apparatus of claim 1, further comprising said hull having a double bottom to thereby prevent leakage of oil from said collection tank.

13. The apparatus of claim 1, further comprising a cylinder cover pivotally connected to a deck of said hull adjacent said oil collection area, said cylinder cover positioned and configured to cover said cylinder when pivoted to a closed position to thereby protect said cylinder, and to provide access to said cylinder when pivoted to an open position to thereby facilitate cleaning and maintenance of said cylinder.

14. The apparatus of claim 1, further comprising a front screen mounted fore said cylinder to thereby prevent trash from getting on said cylinder.

15. The apparatus of claim 1, wherein each of said oil collection troughs declines outboard and said oil transfer troughs decline aft to thereby facilitate flow of collected oil to said oil collection tank.

16. An oil skimming apparatus for collecting oil from a surface of a water body comprising:
   a floatable hull, said hull having an oil collection tank therein,
   a pair of pontoons extending fore of a bow of said floatable hull, said pontoons spaced apart to thereby form an oil collection area therebetween,
   a hollow cylinder, said cylinder having port and starboard open ends, said cylinder having a density greater than water,
   a port bulkhead and a starboard bulkhead, said bulkheads fixed in spaced apart relation within said cylinder,
   said cylinder rotatably mounted in said oil collection area via a driveshaft-member passing through said port and starboard bulkheads, a rotational axis of said cylinder aligned substantially parallel to the surface of the water body and substantially perpendicular to a centerline of said floatable hull, a bottom edge of said cylinder positioned below a waterline of said floatable hull,
   a drive means for selectively rotating said drive shaft,
   an outer oil collection trough mounted along a fore outer surface of said cylinder,
   an outer scraper blade, said outer scraper blade positioned to scrape oil from said fore outer surface of said cylinder and to divert said scraped oil into said outer oil collection trough,
   a port inner oil collection trough, said port inner oil collection trough mounted along a fore inner surface of said cylinder between said port bulkhead and said port open end,
   a port inner scraper blade, said port inner scraper blade positioned to scrape oil from said fore inner surface of said cylinder and to divert said scraped oil into said port inner oil collection trough,
   a starboard inner oil collection trough, said starboard inner oil collection trough mounted along said fore inner surface of said cylinder between said starboard bulkhead and said starboard open end,
   a starboard inner scraper blade, said starboard inner scraper blade positioned to scrape oil from said fore inner surface of said cylinder and to divert said scraped oil into said starboard inner oil collection trough,
   a port oil transfer trough, said port oil transfer trough positioned and configured to transfer oil from said outer oil collection trough and said port inner collection trough to said oil collection tank,
   a starboard oil transfer trough, said starboard oil transfer trough positioned and configured to transfer oil from said outer oil collection trough and said starboard inner collection trough to said oil collection tank,
   a port bulkhead scraper blade, said port bulkhead scraper blade positioned to scrape oil from said port bulkhead and to divert said scraped oil into said port inner oil collection trough, and
   a starboard bulkhead scraper blade, said starboard bulkhead scraper blade positioned to scrape oil from said starboard bulkhead and to divert said scraped oil into said starboard inner oil collection trough.

17. An oil skimming apparatus for collecting oil from a surface of a water body comprising:
   a floatable hull, said hull having an oil collection tank therein,
   a pair of pontoons extending fore of a bow of said floatable hull, said pontoons spaced apart to thereby form an oil collection area therebetween,
   a hollow cylinder, said cylinder having port and starboard open ends, said cylinder having a density greater than water,
   an annular shoulder depending inward from each of said open ends of said cylinder,
   a port bulkhead and a starboard bulkhead, said bulkheads fixed in spaced apart relation within said cylinder,
   said cylinder rotatably mounted in said oil collection area via a driveshaft-member passing through said port and starboard bulkheads, a rotational axis of said cylinder aligned substantially parallel to the surface of the water body and substantially perpendicular to a centerline of said floatable hull, a bottom edge of said cylinder positioned below a waterline of said floatable hull,
   a drive means for selectively rotating said drive shaft,
   an outer oil collection trough mounted along a fore outer surface of said cylinder,
   an outer scraper blade, said outer scraper blade positioned to scrape oil from said fore outer surface of said cylinder and to divert said scraped oil into said outer oil collection trough,
   a port inner oil collection trough, said port inner oil collection trough mounted along a fore inner surface of said cylinder between said port bulkhead and said port open end,
   a port inner scraper blade, said port inner scraper blade positioned to scrape oil from said fore inner surface of said cylinder and to divert said scraped oil into said port inner oil collection trough,
   a starboard inner oil collection trough, said starboard inner oil collection trough mounted along said fore inner surface of said cylinder between said starboard bulkhead and said starboard open end,
   a starboard inner scraper blade, said starboard inner scraper blade positioned to scrape oil from said fore inner surface of said cylinder and to divert said scraped oil into said starboard inner oil collection trough, a port oil transfer trough, said port oil transfer trough positioned and configured to transfer oil from said outer oil collection trough and said port inner collection trough to said oil collection tank, and a starboard oil transfer trough, said starboard oil transfer trough positioned and configured to transfer oil from said outer oil collection trough and said starboard inner collection trough to said oil collection tank.

18. The apparatus of claim 17, wherein said annular shoulders of said cylinder are wiped of oil by said inner scraper blades during use.

19. An oil skimming apparatus for collecting oil from a surface of a water body comprising:

a floatable hull, said hull having an oil collection tank therein, a pair of pontoons extending fore of a bow of said floatable hull, said pontoons spaced apart to thereby form an oil collection area therebetween, a hollow cylinder, said cylinder having port and starboard open ends, said cylinder having a density greater than water, a port bulkhead and a starboard bulkhead, said bulkheads fixed in spaced apart relation within said cylinder, said cylinder rotatably mounted in said oil collection area via a driveshaft-member passing through said port and starboard bulkheads, a rotational axis of said cylinder aligned substantially parallel to the surface of the water body and substantially perpendicular to a centerline of said floatable hull, a bottom edge of said cylinder positioned below a waterline of said floatable hull, a drive means for selectively rotating said drive shaft, an outer oil collection trough mounted along a fore outer surface of said cylinder, an outer scraper blade, said outer scraper blade positioned to scrape oil from said fore outer surface of said cylinder and to divert said scraped oil into said outer oil collection trough, a port inner oil collection trough, said port inner oil collection trough mounted along a fore inner surface of said cylinder between said port bulkhead and said port open end, a port inner scraper blade, said port inner scraper blade positioned to scrape oil from said fore inner surface of said cylinder and to divert said scraped oil into said port inner oil collection trough, a starboard inner oil collection trough, said starboard inner oil collection trough mounted along said fore inner surface of said cylinder between said starboard bulkhead and said starboard open end, a starboard inner scraper blade, said starboard inner scraper blade positioned to scrape oil from said fore inner surface of said cylinder and to divert said scraped oil into said starboard inner oil collection trough, a port oil transfer trough, said port oil transfer trough positioned and configured to transfer oil from said outer oil collection trough and said port inner collection trough to said oil collection tank, a starboard oil transfer trough, said starboard oil transfer trough positioned and configured to transfer oil from said outer oil collection trough and said starboard inner collection trough to said oil collection tank, and said hull having a tapered bow, said tapered bow separated from said oil collection tank via an internal bulkhead, said bulkhead preventing oil from collecting in said tapered bow to thereby prevent said hull from listing forward during collection of oil.

20. An oil skimming apparatus for collecting oil from a surface of a water body comprising:

a floatable hull, said hull having an oil collection tank fixed therein, said hull having a suction outlet for use in pumping collected oil from said oil collection tank, a pair of pontoons extending fore of a bow of said floatable hull, said pontoons spaced apart to thereby form an oil collection area therebetween, a hollow cylinder, said cylinder having port and starboard open ends, an inner and an outer surface of said cylinder having a scratch surface to thereby improve adhesion of oil to said surfaces during collection of oil from the water body, said cylinder having a density greater than water, an annular shoulder depending inward from each of said open ends of said cylinder, a port bulkhead and a starboard bulkhead, said bulkheads fixed in spaced apart relation within said cylinder, a lengthwise annular collar passing through said pair of bulkheads, said cylinder rotatably mounted in said oil collection area via a driveshaft-member passing through said annular collar, a rotational axis of said cylinder aligned substantially parallel to the surface of the water body and substantially perpendicular to a centerline of said floatable hull, a bottom edge of said cylinder positioned below a waterline of said floatable hull, a drive means for selectively rotating said drive shaft, an outer oil collection trough mounted along a fore outer surface of said cylinder, an outer scraper blade, said outer scraper blade positioned to scrape oil from said fore outer surface of said cylinder and to divert said scraped oil into said outer oil collection trough, a port inner oil collection trough, said port inner oil collection trough mounted along a fore inner surface of said cylinder between said port bulkhead and said port open end, a port inner scraper blade, said port inner scraper blade positioned to scrape oil from said fore inner surface of said cylinder and to divert said scraped oil into said port inner oil collection trough, a starboard inner oil collection trough, said starboard inner oil collection trough mounted along said fore inner surface of said cylinder between said starboard bulkhead and said starboard open end, a starboard inner scraper blade, said starboard inner scraper blade positioned to scrape oil from said fore inner surface of said cylinder and to divert said scraped oil into said starboard inner oil collection trough, a port bulkhead scraper blade, said port bulkhead scraper blade positioned to scrape oil from said port bulkhead and to divert said scraped oil into said port inner oil collection trough, a starboard bulkhead scraper blade, said starboard bulkhead scraper blade positioned to scrape oil from said starboard bulkhead and to divert said scraped oil into said starboard inner oil collection trough, each of said scraper blades set at an angle of between 10 to 70 degrees relative to the surface of the body of water, a port oil transfer trough, said port oil transfer trough positioned and configured to transfer oil from said outer oil collection trough and said port inner collection trough to said oil collection tank, a starboard oil transfer trough, said starboard oil transfer trough positioned and configured to transfer oil from said outer oil collection trough and said starboard inner collection trough to said oil collection tank, each of said oil collection troughs declining outboard and each of said oil transfer troughs declining aft to thereby facilitate flow of collected oil to said oil collection tank.

21. The apparatus of claim 20, further comprising a cylinder cover pivotally connected to a deck of said hull adjacent said oil collection area, said cylinder cover positioned and configured to cover said cylinder when pivoted to a closed position to thereby protect said cylinder, and to provide access to said cylinder when pivoted to an open position to thereby facilitate cleaning and maintenance of said cylinder.

\* \* \* \* \*